United States Patent [19]
Edenhofer

[11] 4,074,140
[45] Feb. 14, 1978

[54] ARRANGEMENT FOR MEASURING TEMPERATURES OF WORKPIECES TO BE TREATED BY GLOW DISCHARGE

[75] Inventor: Bernd Edenhofer, Cologne, Germany

[73] Assignee: Ionit Anstalt Bernhard Berghaus, Vadus, Liechtenstein

[21] Appl. No.: 769,164

[22] Filed: Feb. 16, 1977

[30] Foreign Application Priority Data

Feb. 18, 1976 Germany ............................ 2606453

[51] Int. Cl.² ............................................. G21K 5/08
[52] U.S. Cl. ............................ 250/492 R; 250/423 R
[58] Field of Search .................. 250/324, 423 R, 426, 250/306, 492 R, 443

[56] References Cited

U.S. PATENT DOCUMENTS

| 2,240,914 | 5/1941 | Schutze | 250/324 |
| 3,600,126 | 8/1971 | Hellund | 250/324 |

*Primary Examiner*—Bruce C. Anderson
*Attorney, Agent, or Firm*—Michael J. Striker

[57] ABSTRACT

A workpiece to be treated by using glow discharge is mounted in a container which contains a corresponding gas or gas mixture. The container and the workpiece are respectively connected to different terminals of an electrical source, and the resulting electrical potential gradient produces ions which are accelerated for a bombardment of the exterior surface of the workpiece for hardening the exterior surface area thereof. In order to measure an equivalent of the temperature of the workpiece, a thermal sensor element is mounted within a testpiece in heat-conducting relationship therewith. The sensor element is operative for generating a signal in dependence upon the temperature detected. Wires are connected with the sensor element for conducting the detected signal from the sensor element towards the exterior of the container. These wires are located remotely from the field so as to prevent undesirable electrical interference between the field and the detected signal. The testpiece is mounted on the inside wall of the container and is connected to the negative terminal of the source so as to be treated by glow discharge, too.

10 Claims, 3 Drawing Figures

ARRANGEMENT FOR MEASURING TEMPERATURES OF WORKPIECES TO BE TREATED BY GLOW DISCHARGE

BACKGROUND OF THE INVENTION:

The invention generally relates to measuring temperatures of workpieces to be treated by glow discharge for carburizing, decarburizing, metalizing, hardening or the like and, more particularly, to measuring temperatures of workpieces to be nitrided in the presence of a nitrogeneous atmosphere, commonly ammonia gas.

For example, the nitrogen case-hardening process which is termed "nitriding" consists in subjecting machined and preferably heat-treated parts to the action of a nitrogeneous medium, commonly partially dissociated ammonia gas, under certain conditions whereby surface hardness is imparted to the material without necessitating any further treatment. The nitriding process imparts to the metal to be case-hardened vastly improved properties such as increased wear resistance, retention of hardness at elevated temperatures, and resistance to certain types of corrosion.

It has been proposed to nitride a workpiece by electrically connecting a container in which a workpiece is accommodated to a positive terminal of an electrical current source, and by electrically connecting the workpiece itself to a negative terminal of the electrical current source. The source is of sufficient strength to establish an electrical potential or voltage gradient between the container and the workpiece so as to produce about the exterior surface of the workpiece a glow discharge field which accelerates the ions in the nitrogeneous atmosphere surrounding the workpiece to thereby heat the workpiece and harden the exterior surface of the latter. A glow discharge is a discharge brought about as a result of ionization of a gas medium surrounding a conductor.

It has been proposed to measure the temperature to which the workpiece is heated by inserting a thermal sensor element, such as a thermocouple, in a bore either already available or deliberately machined in the workpiece. However, the wires, which conduct the electrical signal generated from the temperature detected at the heated workpiece in direction towards the exterior of the container to an indicating instrument, intersect and pass through the glow discharge field. This results in the decided disadvantage that the ionized field undesirably influences and interferes with the electrical signal carried by the wires and that atoms can be embedded in the thermocouple and wire material which influence the signals, too. The measurement data is no longer accurate or reliable. In extreme cases of ion concentration the sensor element can be fully destroyed.

Furthermore it is only possible to measure at a relatively large distance relative to the exterior surface of the workpiece. However, this necessitates a rather long waiting time until the heat at the exterior surface of the workpiece reaches the deeply embedded sensor element. This is evidently a very inefficient technique.

SUMMARY OF THE INVENTION

Accordingly, it is the general object of the present invention to overcome the disadvantages of the prior art.

Another object of the present invention is to prevent undesirable electrical interference between a glow discharge field and a signal detected by a thermal sensor so as to improve the accuracy and reliability of the temperature data.

Still another object of the present invention is to minimize the waiting time required by a thermal sensor element to detect the temperature of a workpiece.

In keeping with these objects and others which will become apparent hereinafter, one feature of the invention resides in a combination in an arrangement for measuring temperatures of workpieces to be treated by glow discharge, which comprises a container for receiving a treating gas or gas mixture and a workpiece. An electrical potential gradient is established between the container and the workpiece to produce about the exterior surface of the workpiece a surface glow discharge which accelerates ions for a bombardment of the exterior surface of the workpiece for heating and treating the latter. In order to measure the temperature of the workpiece, a thermal sensor element is mounted within a testpiece on the inside of the container and is operative for generating a signal in dependence upon the temperature detected. Electrically-conductive wires are employed for conducting the detected signal from the sensor element towards the exterior of the container. These wires are located remotely from the glow discharge field to thereby prevent undesirable interference between the field and the detected signal.

In accordance with the invention, the location of the wires remotely from the field allows the temperature of the workpiece to be obtained with high accuracy due to the fact that the field no longer interferes with the signal carried by the wires.

The testpiece has the same electric potential as the workpieces and is therefore also treated by glow discharge. In accordance with the invention, the sensor element is mounted within the testpiece at a location remote from the glow discharge field so as to prevent interference with the same. The sensor element in this case is operative for sensing the temperature of the testpiece and using this data as an indication of the temperature of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
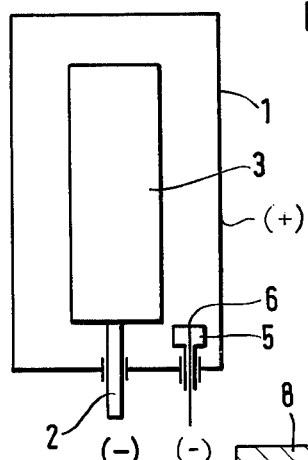
FIG. 1 is a diagrammatic view showing a method and an arrangement for measuring temperatures of workpieces in accordance with the present invention.

FIG. 1 diagrammatically shows a metallic container 1 in which at least one metallic workpiece, and preferably a plurality of metallic workpieces constituting a charge 3 of workpieces, is accommodated. The container 1 is connected to a positive (+) terminal of a direct current electrical source; and the charge 3 is connected, by means of conductor 2 which extends through a wall of the container 1, to a negative (−) thermally of the current source. However, the current source may also be an alternating current electrical source.

The current source is operative for establishing an electrical potential or voltage gradient between the container 1 and the charge 3 so as to ionize the gas or gas mixture in the container 1 so that the ions bombard the exterior surface of each workpiece of the charge 3 to heat the workpieces and for instance in the case of nitriding to penetrate into the surface area of the workpieces. For instance, the gaseous medium surrounding each workpiece in the container is a nitrogeneous medium, commonly partially dissociated ammonia gas for nitriding or case-hardening the exterior surfaces of the workpieces. Of course, other hardening agents such as carbon and other gases or gas mixtures for other treatments can be used.

In order to determine how the treatment is progressing, it is necessary to know the temperature of the workpieces.

Therefore, a testpiece 5 is permanently installed at the inside wall of the container 1. The testpiece 5 is also connected to the negative (−) terminal of the electrical current source and, in analogous manner, an electrical potential gradient is established between the testpiece 5 and the container 1 so as to treat the testpiece 5 and the charge 3 by glow discharge so that the temperature of the testpiece 5 is representative of the temperature of the workpieces.

A heat sensing means 6 or thermocouple, which is located within the testpiece 5, is operative for sensing the temperature of the testpiece 5 itself. By mounting the thermocouple wires within the interior of the testpiece 5, undesirable electrical interference between the field and the detected signal is substantially prevented.

Figure 2:
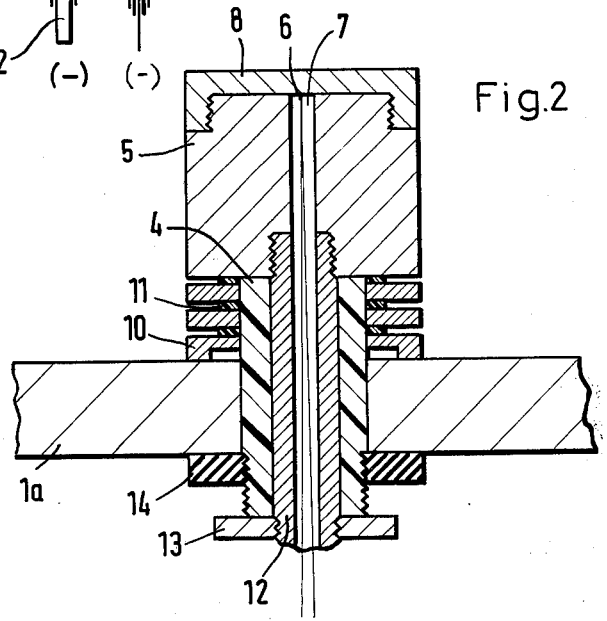
FIG. 2 is an enlarged view in partial vertical section of a detail of FIG. 1 in accordance with one embodiment of the invention.

FIG. 2 shows in enlarged vertical section a testpiece 5 mounted on a wall 1a of the container 1. It will be understood that, although the terminology "testpiece" is used to describe the part identified by reference numeral 5, it is also within the spirit of the invention that this part 5 represents a "workpiece" of the charge 3. However, for the purpose of consistency of expression only, the term "testpiece" will be used hereinafter to identify part 5.

Hence, the testpiece 5 is mounted at a fixed predetermined spacing from the wall 1a. A metallic tubular member 12 is threadedly connected with testpiece 5 and surrounds the thermocouple wires 15. The electrically-conductive tubular member 12 is electrically conducted to the negative (−) terminal of the source so as to supply the electrical energy needed to establish a potential gradient between the testpiece 5 and the container.

An electrically-insulating tubular sleeve 4 surrounds the tubular member 12, and both the tubular member 12 and the tubular sleeve 4 extend from the testpiece 5 through the wall 1a and to the exterior of the container 1. Nut 14 is threadedly mounted on sleeve 4 to fixedly mount the latter on the wall 1a; nut 13 is threadedly mounted on tubular member 12 to fixedly mount the latter on the sleeve 4.

Means are provided in the predetermined spacing between the testpiece 5 and the wall 1a for preventing sparking between the former and the latter. A plurality of electrically-conductive discs 10 are alternately arranged with respect to electrically-insulating discs 11. Discs 11 are smaller than discs 10 so that air gaps are formed between juxtaposed discs 10. Thus, the danger of sparking or flash-over which would cause discontinuance of the glow discharge field is prevented.

A bore 7 is formed in testpiece 5 and is aligned with a corresponding interior passage extending through the tubular member 12. The heat sensing means or thermal sensor element 6 is mounted in heat-conductive relationship with the testpiece 5 by being soldered to a metallic shielding plate 8 which is, in turn, threadedly mounted in heat-conducting relationship with the testpiece 5. The shielding plate is preferably constituted by austenitic steel, i.e. a material resistant to nitrogen diffusion. Thus, the sensor element 6 can be proximately located relative to the circumambient region of the testpiece 5 and still be shielded from the deleterious effects of the ionized field. The thickness of the shielding plate 8, i.e. its dimension between the sensor element 6 and the ionized field, is made as small as possible to thereby permit the sensor element 6 to quickly and accurately detect the temperature at the exterior surface of the testpiece in a minimum amount of waiting time.

In order to simplify the structural details of FIG. 2, it will be understood that the tubular member 12 need not be threadedly mounted into testpiece 5, but can also be of one piece with the testpiece 5. Moreover, the shielding plate 8 can be connected to the testpiece 5 in other ways than by a threaded connection, e.g. by soldering or the like.

It will be understood that the testpiece 5 itself is intended not to be frequently interchanged. Usual maintenance may include replacing the shielding plate 8 and the sensor element 6. During use, the measurement of the temperature of a single testpiece 5 can be used as an accurate indication of the temperature of one or a full charge of workpiece.

Inasmuch as the tubular member 12, testpiece and shielding plate 8 are all maintained at a relatively high voltage in the embodiment of FIG. 1, a buffer or isolator may be favorably used between testpiece 5 and a temperature measuring and indicating instrument (not illustrated). Such temperature instrumente, which are connected to the free ends of the wires 15 are generally maintained at ground potential and therefore must be protected or isolated from this rather high voltage.

Figure 3:
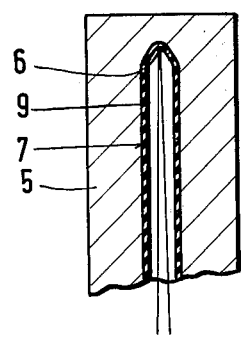
FIG. 3 is a broken-away view analogous to FIG. 2 showing another embodiment of the invention.

Hence, FIG. 3 illustrates an embodiment in which an electrically-insulating or ceramic member 9 is fittingly inserted into a bore 7 which extends as proximately as possible to the exterior surface of the testpiece 5. The hollow ceramic member 9 has good heat-conducting properties so that the sensor element 6 will remain operative for sensing the temperature at the exterior surface of the testpiece when the sensor element 6 is inserted into the interior of the ceramic member 9 and into physical contact therewith.

The ceramic member 9 thus electrically isolated the high voltage existing in the testpiece 5 from the grounded measuring instrument. Hence, no costly isolation circuitry is any longer required for the measuring instrument.

In accordance with the invention, it is no longer necessary to provide bores in each one of the workpieces of a charge and to insert a thermal sensor element in each one of these bores. A single testpiece can be employed.

While the invention has been illustrated and described as embodied in an arrangement and method of measuring temperatures of workpieces to be case-hardened, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an arrangement for measuring temperatures of workpieces to be treated by glow discharge a combination comprising a container for receiving a treating gas or gas mixture and a charge of one or more workpieces to be treated; means for establishing an electrical potential gradient between said container and the workpiece so as to produce a glow discharge field; and means electrically-insulated in relation to said container and having the same potential than the workpiece(s) for indicating the temperature of the workpiece(s), including heat sensing means having a thermal sensor element mounted within the testpiece in heat-conducting relationship therewith and operative for generating a signal in dependence upon the temperature detected, and means for conducting the detected signal from said sensor element towards the exterior of said container, said conducting means being located remote from said glow discharge field to thereby prevent undesirable interference between said field and the detected signal.

2. A combination as defined in claim 1; and further comprising means surrounding said conducting means for shielding the latter from said field, including an electrically-conductive tubular member connected with said testpiece and surrounding said conducting means, and an electrically-insulating tubular sleeve surrounding said tubular member; and wherein said container has a wall on which said testpiece is mounted, and wherein said tubular member and said tubular sleeve both extend through said wall to the exterior of said container.

3. A combination as defined in claim 2; and further comprising a shielding plate mounted on said testpiece in juxtaposed relationship with said sensor element and operative for shielding the latter from said field.

4. A combination as defined in claim 3; wherein the shielding plate is constituted by case-hardened resistant material.

5. A combination as defined in claim 3, wherein said shielding plate has a wall thickness between said testpiece and said field such that said sensor element is proximately located with respect to said field.

6. A combination as defined in claim 1, wherein said sensor element is mounted in electrically-insulating relationship with said testpiece and with said container.

7. A combination as defined in claim 6; and further comprising a bore in said testpiece, and a hollow ceramic member mounted in said bore, said sensor element being mounted in the interior of said ceramic member.

8. A combination as defined in claim 1; and further comprising a bore in said testpiece, and wherein said sensor element is mounted in said bore in electrically-conducting relationship with said testpiece.

9. A combination as defined in claim 8; and further comprising an electrically-conductive shielding plate mounted on said testpiece in juxtaposed relationship with said sensor element, and wherein said sensor element is mounted in electrically-conducting relationship with said shielding plate.

10. A combination as defined in claim 1, wherein said testpiece is fixedly held at a spacing from said container; and further comprising means in said spacing for preventing sparking between said container and said testpiece, including a first set of electrically-conductive discs and a second set of electrically-insulating discs, each disc of one of said sets being alternately arranged and being smaller than every disc of the other of said sets so as to respectively form a plurality of air gaps in said spacing.

* * * * *